United States Patent [19]

Katcs et al.

[11] 4,254,863
[45] Mar. 10, 1981

[54] BARBECUE PACK

[75] Inventors: Michael W. Katcs, Johannesburg; Peter J. De Luca, Krugersdorp; Peter S. Pretorius, Sandton, all of South Africa

[73] Assignee: Burco (Proprietary) Limited, Johannesburg, South Africa

[21] Appl. No.: 54,495

[22] Filed: Jul. 3, 1979

[30] Foreign Application Priority Data

Oct. 20, 1978 [ZA] South Africa .................... 78/5935

[51] Int. Cl.³ .................... B65D 85/00; F24C 1/16; F24C 3/00
[52] U.S. Cl. .................... 206/216; 126/9 A; 126/25 R
[58] Field of Search .............. 206/216, 525; 126/9 A, 126/9 R, 25 R

[56] References Cited

U.S. PATENT DOCUMENTS

| | | | |
|---|---|---|---|
| 3,370,582 | 2/1968 | Rauh | 126/9 A |
| 3,407,802 | 10/1968 | Warner | 126/25 R |
| 3,478,733 | 11/1969 | Meyerhoefer | 126/9 A |
| 3,682,154 | 8/1972 | Mollere | 126/9 A |

Primary Examiner—William T. Dixson, Jr.
Attorney, Agent, or Firm—Ladas & Parry

[57] ABSTRACT

A disposable barbecue pack comprising in a packaging container a fire container of a non-combustible material, a grid, a support means for the grid, and fuel. The support means of a preferred embodiment is either a sleeve of cardboard or a wire framework. The fire container, grid and the framework structure are of lightweight construction to be usable only once or twice, and are also such that they may be crumpled up.

17 Claims, 1 Drawing Figure

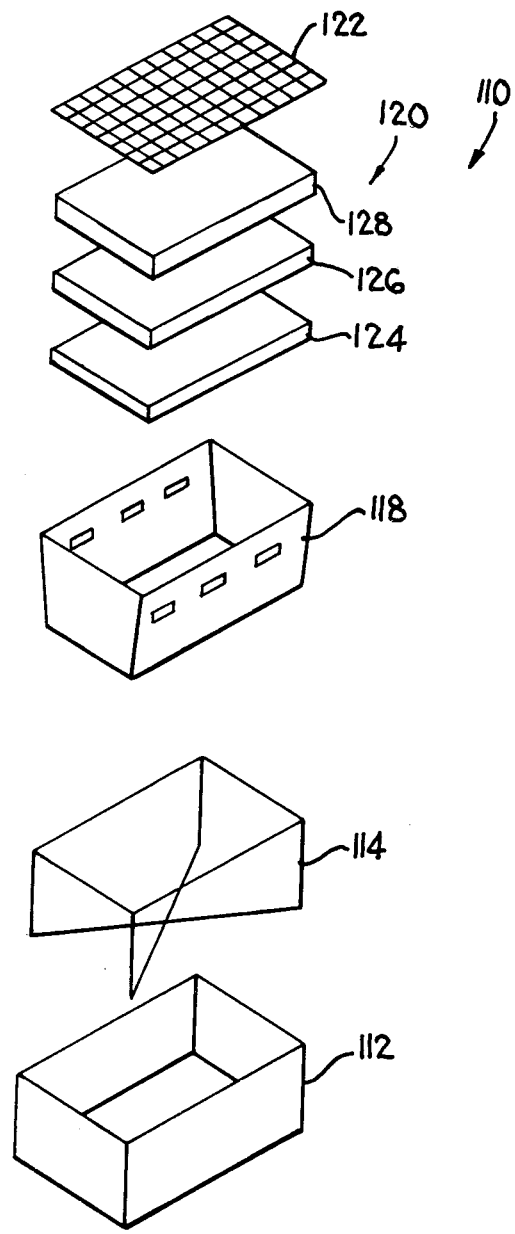

BARBECUE PACK

This invention relates to a barbecue pack. More particularly, it relates to such a pack that may be used once or twice and then be easily disposed of.

According to the invention, there is provided a barbecue pack which includes a fire container that is of a non-combustible material in which burning fuel members may be contained;

a grid on which food to be cooked may be supported;

a framework structure of a non-combustible material for supporting the grid in position above the fire container; and combustible fuel members.

The pack may include a packaging container in which the fire container, the grid, the framework structure and the fuel members are contained. The packaging container may conveniently be of a combustible material.

The fire container may also be supported by the framework structure. This may conveniently be via a lip formation on the fire container.

The pack may also include an igniting means for igniting the fuel members. For example, the fuel members may be wood, charcoal or the like, and the igniting means may be paper, a suitably inflammable hydrocarbon, or the like. In one particular embodiment, the fuel members may comprise charcoal lumps which have been soaked with paraffin. These paraffin impregnated charcoal lumps may be packed in a suitable non-porous container. However, any suitable combustible material and any suitable igniting means may be utilised.

It will be appreciated that the combustible fuel members will need to be supplied with oxygen in order to burn. Thus, the fire container may have apertures which may particularly be in wall portions of the fire container. These apertures may be located close to an upper edge of the wall portions.

The packaging container may not have any apertures, it being necessary to remove the fire container and fuel members contained therein, the grid and the framework structure from the packaging container before the fuel members are ignited. The fire container further preferably tapers inwardly and downwardly.

The packaging container may have a lid or some other closure member whereby it may be closed.

The packaging container may conveniently be of cardboard, wood, a synthetic plastics material or the like. The fire container may be of any suitable metal, such as aluminium. As regards the grid, it may also be of a suitable metal and may be formed from lengths of wire or an expanded sheet. Further, the fire container and the grid may be of a suitable lightweight construction such that they may only be used a limited number of times. They may further be of a sufficient lightweight construction to be crumpled up manually, such that after being used once or twice they may be crumpled up and be easily disposed of.

The invention is now described, by way of an example, with reference to the accompanying drawing, which shows an exploded view of an embodiment of a barbecue pack in accordance with the invention.

Referring now to the drawing, a barbecue pack is designated generally by reference numeral 110. It comprises a packaging container in the form of a rectangular cardboard box 112, a wire frame 114, an aluminium tray 118 which constitutes a fire container, a pack of combustible fuel members 120 and a grid 122.

The frame 114 fits in the box 112 and is removable therefrom. The tray 118 in turn fits within the frame 114 and is also removable from the box 112. The fuel pack 120 is located in the tray 118 and the grid 122 is located on top of the tray 118 and the frame 114. The grid 122 is slightly larger than the tray 118 to be supported by the frame 114 but is still small enough to be housed within the box 112.

The tray 118 is of a sufficiently thick material to be self-supporting. The tray 118 may alternatively have an outwardly directed lip along its upper edge which then supportably engages the wire frame 114.

The fuel pack 120 comprises some crumpled pieces of paper 124, a paper packet 126 which contains pieces of wood and a paper packet 128 which contains charcoal lumps.

As shown, the tray 118 has apertures 130 in its sides through which the fuel pack 120 may be ignited and through which the fuel pack 120 is supplied with oxygen for combustion.

In use, the frame 114 is removed from the box 112, together with the tray 118, the fuel pack 120 and the grid 122. The tray 118 containing the fuel pack 120, with the frame 114 in position about it and supporting the grid 122 are then placed in a suitable position and the fuel pack 120 ignited. Food may then be cooked on the grid 122.

After use the pack may be easily disposed of.

Thus, by these means, a barbecue pack is provided that is lightweight to be easily transportable and usable. Further, the pack is cheap and disposable and is provided complete with fuel, thereby obviating the necessity of using and transporting relatively permanent apparatus which, after being used several times becomes dirty and needs to be cleaned.

We claim:

1. A barbecue pack which is ready for immediate use and immediate ignition and which includes combustible fuel members;

an igniting means for igniting the fuel members;

a fire container that is of a non-combustible material in which the fuel members and the igniting means are contained, with the fuel members being located above the igniting means and with the igniting means being accessible to be readily ignitable;

a grid on which food to be cooked may be supported; and an assembled unitary framework structure of a non-combustible material in which the fire container is located and which supports the fire container, and which also supports the grid in position above the fire container without any assembly, construction or packing required, such that the igniting means may be immediately ignited and food may be immediately placed on the grid to be cooked.

2. A pack as claimed in claim 1, which includes a packaging container in which the fire container, the grid, the framework structure and the fuel members are contained.

3. A pack as claimed in claim 2, in which the packaging container is of a combustible material.

4. A pack as claimed in claim 1, in which the framework structure also supports the fire container.

5. A pack as claimed in claim 1, in which the fire container has apertures through which air may pass to burning fuel members therein.

6. A pack as claimed in claim 5, in which the apertures are in wall portions of the container.

7. A pack as claimed in claim 6, in which the apertures are close to an upper edge of the wall portions.

8. A pack as claimed in claim 2, in which the combustible fuel members are located in the fire container which in turn is contained in the packaging container, and in which the packaging container has no apertures in its walls.

9. A pack as claimed in claim 1, in which the fire container tapers inwardly and downwardly.

10. A pack as claimed in claim 2, in which the packaging container has a closure member.

11. A pack as claimed in claim 1, which is disposable.

12. A pack as claimed in claim 1, in which the fire container is of a lightweight construction such that it may only be used a limited number of times.

13. A pack as claimed in claim 1, in which the fire container is of sufficient lightweight construction to be crumpled up manually.

14. A pack as claimed in claim 1, in which the grid is of sufficient lightweight construction to be used only a limited number of times.

15. A pack as claimed in claim 1, in which the grid is such that it may be crumpled up manually.

16. A pack as claimed in claim 1, in which the framework structure has a base portion on which the fire container is disposed and an upper portion on which the grid is disposed, whereby the grid is supported above the fuel members in the fire container.

17. A pack as claimed in claim 1, wherein the framework structure has a base portion and an upper portion and defines an interior space, and the pack further comprises a packaging container in which the framework structure, the grid, the fire container and the fuel members are contained with the fire container disposed in the interior space of the framework structure on the base portion thereof and with the grid disposed on the upper portion of the framework structure, above the fuel members in the fire container.

* * * * *